United States Patent Office 3,359,689
Patented Dec. 26, 1967

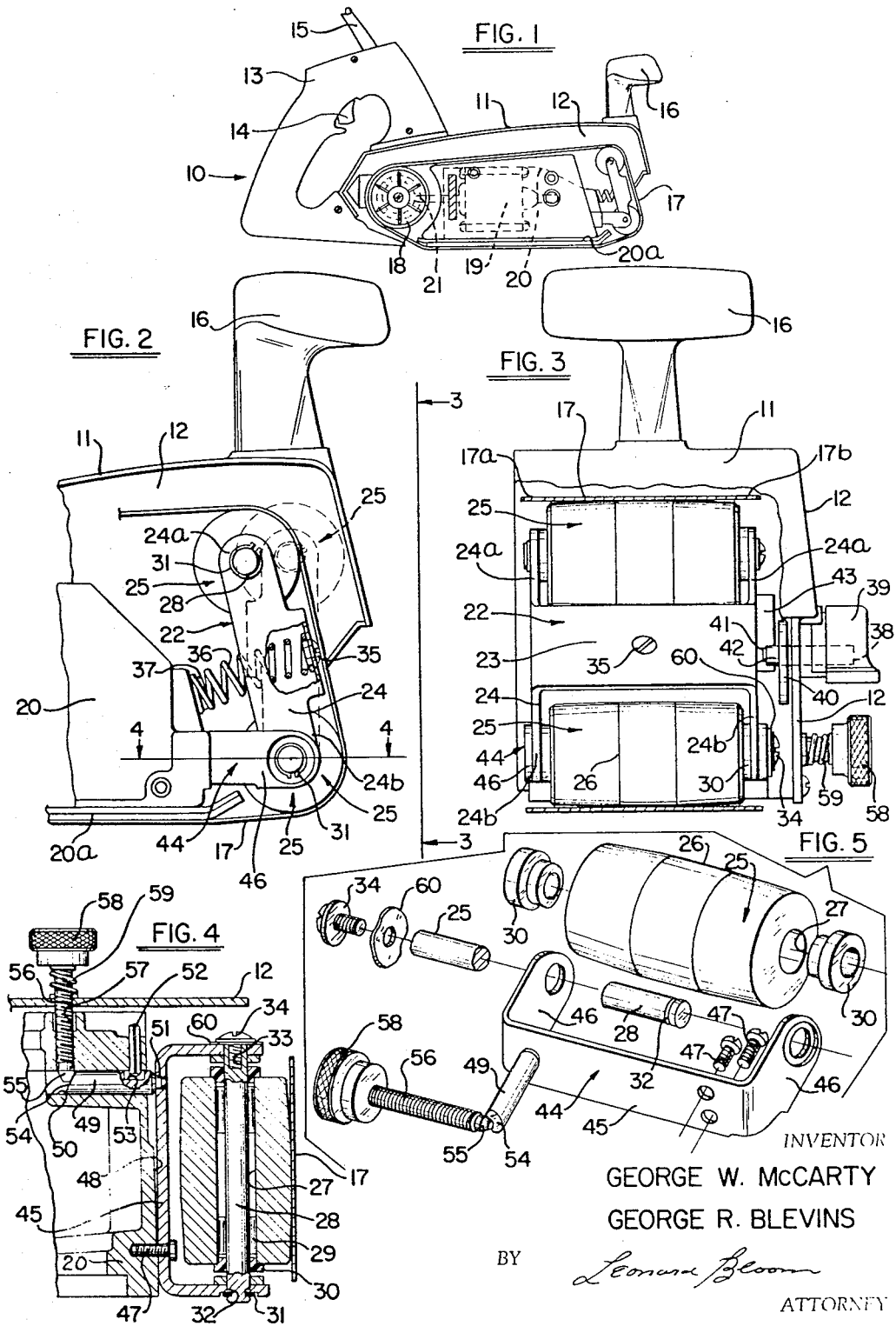

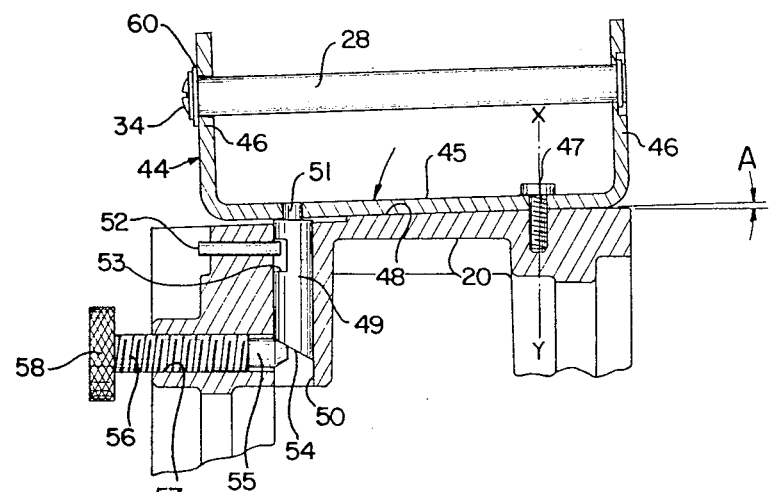
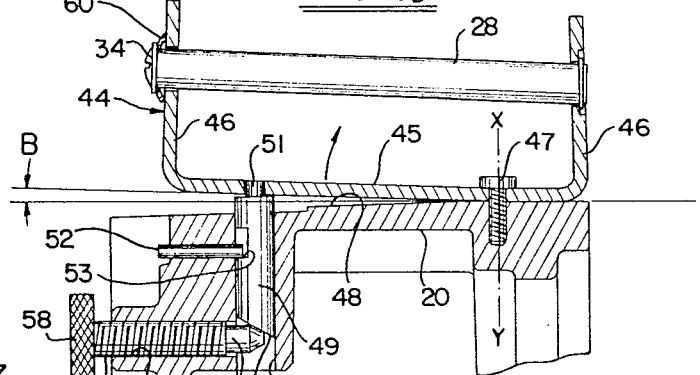
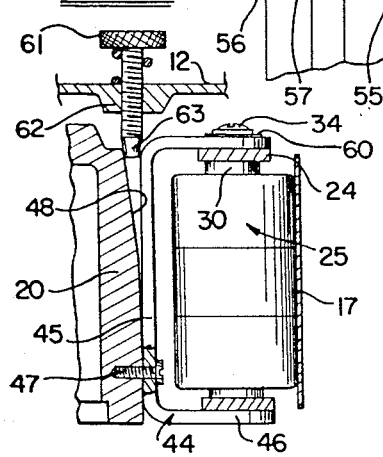

3,359,689
TRACKING MEANS FOR BELT SANDER
George W. McCarty, Towson, and George R. Blevins, Baltimore, Md., assignors to The Black and Decker Manufacturing Company, Towson, Md., a corporation of Maryland
Filed Apr. 22, 1965, Ser. No. 449,983
9 Claims. (Cl. 51—170)

ABSTRACT OF THE DISCLOSURE

The device disclosed herein is a portable belt sander which comprises an elongated housing having drive and idler pulley means adjacent opposite ends thereof, and a drive motor between the pulley means and coupled to the drive pulley means. An endless belt is entrained over the pulley means and surrounds the latter as well as the motor. The idler pulley means is supported so that the distance between the idler pulley and drive pulley means, as well as the angular relation (parallel or non-parallel) therebetween can be adjusted. Handle and switch means are fixed to the housing for manipulation and control of the device.

Objects and teachings of the present invention

It is an object of the present invention to provide a belt tracking means which has an inherently "fine" adjustment involving a high degree of precision and convenience, yet one which is capable of being economically produced on a quantity basis.

The present invention finds particular utility in a belt sander which generally comprises a housing, an endless belt within the housing, power-operated means to drive the belt, and guiding pulley means for the belt.

In accordance with the broad teachings of the present invention, there is herein illustrated and described, an improvement in the tracking means for the endless belt; and this improved tracking means includes, in combination, a support means for the guiding pulley means. This support means includes a member which is disposed transversely of the belt and is substantially parallel to the axis of the guiding pulley means. A portion of the member is mounted to the housing by suitable securing means and is cantilevered therefrom; and the housing, adjacent to the remaining portion of the member, is relieved or cut away, preferably in a manner to form an angularly inclined face. The design and structure of the member, as well as the manner in which it is used, result in the member having (to a certain degree) an inherent resiliency—generally referred to as a "spring back" tendency—with the result that the member is constantly urged in a direction towards the inclined face of the housing and substantially about its securing means as a pivot axis. In opposition to this inherent resiliency, a manually-manipulatable adjustable means is carried by the housing for selectively pivoting the member, which supports the guiding pulley means, in the opposite direction substantially about the axis of the securing means, thereby adjusting the axis of the guiding pulley means, and alining it with respect to the belt.

In accordance with the further teachings of the present invention, the support means includes a bracket member for supporting the guiding pulley means within the belt. This bracket member includes a base disposed transversely of the belt and substantially-parallel to the axis of the guiding pulley means. The base of the bracket member has an end portion secured to the housing, and since the inclined face of the housing diverges away from the secured end portion of the bracket base, the bracket tends to spring back towards the inclined face substantially about its secured end as a pivot axis.

Preferably, the bracket member is bifurcated and includes a pair of substantially-parallel legs formed integrally with its base, while the guiding pulley means includes at least one pulley provided with an axle mounted between the legs of the bracket member. The axle has at least one end portion extending beyond the respective leg of the bracket member, and yieldable means are disposed between the respective leg of the bracket member and a suitable abutment provided on the extending end of the axle. Consequently, whenever the adjustable means is manipulated to pivot the base of the bracket member away from the inclined face of the housing, and the bracket member is thereby constrained so as to draw the legs of the bracket member closer together, the yieldable means takes up the "slack" between the abutment means on the axle and the respective leg of the bracket member.

The adjustable means, which is in opposition to the inherent resiliency of the bracket member, preferably comprises a wedge element carried by the housing for limited longitudinal sliding movement towards and away from the base portion of the bracket member. This wedge has a portion in engagement with the remaining portion of the bracket base which extends from its secured end. An externally-accessible screw element is carried by the housing transversely of the wedge for alternate advance and retraction with respect to the housing. At least one of the elements, preferably the wedge, has an inclined surface in engagement with the other element for urging the wedge towards the bracket member in response to the advance of the screw within the housing. In such a manner, the axis of the guiding pulley means may be accurately and conveniently alined with respect to the belt travel.

The improved tracking means of the present invention, while not necessarily being confined thereto, nevertheless facilitates the design and manufacture of a "compact" belt sander, one which is commercially practical; this compact belt sander generally comprises, in combination, a housing, an endless belt within the housing, a motor within a frame disposed along a generally longitudinal axis within the belt, driving pulley means within the belt at one end of the motor frame, means drivingly interconnecting the driving pulley means and the motor, guiding pulley means within the belt at the opposite end of the motor frame, the guiding pulley means having an axis which is transverse to the longitudinal axis of the motor, and tracking means for pivotably adjusting the guiding pulley means about an axis which is perpendicular to the motor axis and to the axis of the guiding pulley means, with the belt having a substantially horizontal lower run supported by a platen below the motor frame, and with the belt further having an upper run which is inclined upwardly at a slight acute angle from the driving pulley means to the guiding pulley means.

These and other objects of the present invention will become apparent from a reading of the following specification, taken in conjunction with the enclosed drawings.

Description of the drawings

FIGURE 1 is a side elevation of the overall belt sander with the motor and its associated gearing being shown in broken lines.

FIGURE 2 is an enlarged fragmentary portion of FIGURE 1, showing a suitable form of guiding pulley means which may be used in conjunction with the improved tracking means of the present invention.

FIGURE 3 is a front elevation thereof, taken along the lines 3—3 of FIGURE 2.

FIGURE 4 is a traverse section, taken along the lines 4—4 of FIGURE 2, and showing the improvement in the belt tracking means of the present invention.

FIGURE 5 is an exploded perspective thereof, showing the major components in relationship to one another.

FIGURE 6a is an enlarged schematic presentation of the improved belt tracking means of the present invention, showing one of its alternate extreme positions in which the bracket member, due to its inherent resiliency, rests flush against the inclined face of the housing.

FIGURE 6b corresponds substantially to that of FIGURE 6a, but shows the other alternate extreme position in which the bracket member is constrained away from the inclined face of the housing.

FIGURE 7 is a modification of the structure shown in FIGURE 4.

*General description of the overall tool*

With reference to FIGURE 1, there is illustrated a belt sander 10 which incorporates the teachings of the present invention. This unit generally comprises a housing 11 including a side wall 12, an end handle 13 including a trigger switch 14 for energizing the unit from an electric line 15, a front handle 16 to facilitate manual control of the unit, an endless belt 17 within the housing disposed to one side of the side wall, a driving pulley 18 for the belt, the belt having a lower run which is substantially horizontal and an upper run which is inclined upwardly by a slight acute angle from the driving pulley, a mtor 19 within a motor frame 20 disposed within the belt, a platen 20a carried by the motor frame to support the belt, and suitable gearing, denoted as at 21, for driving the pulley from the motor.

The belt sander 10 is generally referred to a "compact" belt sander and constitutes a preferred embodiment in which the improved tracking means of the present invention finds particular utility; however, it will be appreciated that the teachings of the present invention are equally applicable to a wide variety of abrading or like tools involving an endless belt.

*The preferred form of guiding pulley means*

With reference to FIGURES 2 and 3, the guiding pulley means includes a bracket 22 disposed at the opposite end of the motor frame 20 in relationship to the driving pulley 18. This bracket 22 has a main body portion 23 and a pair of substantially-parallel side flanges 24. Each flange 24 has respective ends 24a and 24b projecting above and below the body portion of the bracket. A pair of guiding pulleys 25 are mounted between the respective ends of the side flanges 24 of the bracket 22. Preferably, but not necessarily, the pulleys 25 are identical to one another and are provided with an intermediate crowned portion 26 to assist in the guidance and alinement of the belt 17. Preferably, the belt 17 has respective portions 17a and 17b which overhang the pulleys 25 as shown more clearly in FIGURE 3. These overhanging portions 17a and 17b allow the tool to be used in flush sanding operations, and also, assist in the tracking of the belt on the guiding pulleys.

The mounting of the pulleys 25 is substantially identical to one another, and as shown in FIGURE 4, each pulley 25 has a bore 27 and an axle 28 disposed within the bore. Each axle 28 is mounted (preferably with a rotatable fit) within suitable apertures formed in the respective ends 24a and 24b of the bracket flanges 24. A roller bearing 29 is disposed at each end of the pulley 25 for rotatably journaling the pulley on its respective axle 28. Also, a bushing 30, preferably molded from a suitable plastic material, is disposed in each end of the bore of the pulley 25 axially of its respective bearing 29 so as to provide a suitable seal. The respective ends of the axle 28 project beyond the respective bracket flanges 24. One of the axle ends has a snap ring 31 in an annular groove 32 to form a shoulder. The other end of the axle 28 has a tapped recess 33 which receives a headed washer-type of screw 34 for retaining the axle 28 with respect to the bracket 22. The combination of the bracket 22 and the pulleys 25—the pulleys being mounted upon the bracket 22 for a conjoint movement—constitutes a preferred form of guiding pulley means with which the improved tracking means of the present invention is especially suited; however, it will be appreciated by those skilled in the art that other forms of guiding pulleys means may be used consonant with the teachings of the present invention.

The guiding pulley means herein disclosed forms no part of the present invention, but is described and claimed in the co-pending Blevins' application Ser. No. 447,317, filed April 12, 1965, entitled "Guiding Pulley Means for Belt Sander," and assigned to the assignee of the present invention and now Patent No. 3,312,116 dated April 4, 1967.

*A preferred form of tensioning and retraction means*

The body portion 23 of the bracket 22, see FIGURE 2 again, carries a screw 35 centrally thereof so as to seat one end of a coiled compression spring 36, the opposite end of which is piloted on a stud 37 formed on the forward portion of the motor frame 20. This provides a resilient means for constantly urging the bracket 22 and at least the upper pulley 25 into engagement with the belt 17, and is generally referred to in the art as the "tensioning" means for the belt.

The means to selectively retract the brackt 22 away from the belt 17 includes a shaft 38, see FIGURE 3 again, journaled in the side wall 12 of the housing. A lever 39 is carried on the outward end of the shaft 38. The inward end of the shaft 38 is radially enlarged, as at 40, and carries a crank pin 41 and a roller 42 in engagement with a tab 43. The tab 43 is formed integrally with one of the side flanges 24 of the bracket 22 and is bent substantially at right angles thereto. Rotation of the lever 39 (and hence the shaft 38 and crank pin 41) causes the roller 42 to engage the tab 43 and to retract the bracket 22 away from the belt against the force of the spring 36. This enables the belt 17 to be removed from the tool. Preferably, the movement of the bracket 22 comprises a pivotal movement about the axis of the lower guiding pulley 25, and the broken lines in FIGURE 2 illustrate the movement of the bracket 22 and the upper guiding pulley 25 (under the force of the spring 36) after the belt 17 has been removed and the lever 39 has been released.

*The improved tracking means of the present invention*

With reference to FIGURES 4 and 5, the bracket 22 and its guiding pulleys 25 are mounted within the tool by means of a lower supporting bracket 44. This bracket 44 is bifurcated and has a base portion 45 and a pair of substantially-parallel legs 4. The legs 46 straddle the lower ends 24b of the flanges 24 of the first bracket 21 and are retained betwen the flanges 24 by means of the screw 34. A pair of screws 47, see FIGURE 5, secures one end of the base 45 of the bracket 44 to the motor frame 20, with the remaining portion of the bracket base being cantilevered therefrom.

The motor frame 20 (or an equivalent portion of the housing) has an inclined front face 48 which is cut away or suitably relieved so that it diverges in a direction away from the screws 47 as shown in FIGURE 4. The structure, dimensions, and material of the bracket 44 (which may be of a suitable "spring" steel capable of being heat-treated) are such that the bracket 44, in the manner in which it is used, has a degree of inherent resiliency. This inherent resiliency causes the bracket 44 to tend to "spring back" towards the inclined face 48 of the motor frame 20 in a direction substantially about the screws 47 as a pivot axis; this pivot axis is substantially vertical when the tool is oriented in its usual operating position as shown in FIGURE 1.

With the bracket 44 thus being constantly urged towards the inclined front face 48 of the motor frame 20, manually-manipulatable adjustable means is provided to move the member 44 (and hence the guiding pulley means) away from the inclined face 48. This adjustable means, which is in opposition to the inherent resiliency of the bracket 44, includes a wedge 49 mounted for limited longitudinal sliding movement within a recess 50 formed in the motor frame 20. This wedge 49 has a pilot portion 51 in engagement with the base 45 of the bracket 44. The sliding movement of the wedge 49 in the recess 50 is limited by means of pin 52 retained in the motor frame 20 and received within a slot 53 formed within the wedge 49, thus preventing the bracket 44 from being overstressed. The inward face of the wedge 49 is inclined or tapered, as at 54, and is adapted to engage a tapered pilot 55 of a screw 56. This screw 56 is threaded into a tapped recess 57 in the motor frame 20, and the screw 56 extends beyond the side wall 12 of the housing and carries a knurled adjusting knob 58. Preferably, but not necessarily, a coiled spring 59 is disposed between the knob 58 and the side wall 12 for increased rigidity of the screw 56. Moreover, a resilient washer 60 is disposed between the respective headed screw 34 and the respective leg 46 of the bracket 44 for a purpose hereinafter described.

*Operation of the tracking means of the present invention*

When the screw 56 is advanced into the housing, the wedge 49 will be advanced forwardly in its engagement with the base 45 of the bracket 44—in opposition to the inherent resiliency of the bracket 44—and hence will pivot the bracket 44 about the vertical axis of the securing screws 47. Since the first bracket 22 is supported upon the legs 46 of the bracket 44, the pivotal movement of the bracket 44 will be imparted to the bracket 22, and from the bracket 22, to the guiding pulleys 25. In such a manner, the respective axes of the guiding pulleys 25 will be adjusted or alined with respect to the travel of the belt 17; and since the guiding pulleys 25 are conjointly mounted as previously described, their respective axes will be alined simultaneously for conjoint tracking of the belt.

The operation of the present invention may be more clearly appreciated by means of the schematic illustration of FIGURES 6a and 6b. In FIGURE 6a, the adjusting screw 56 is retracted out of the housing, the wedge 49 is accordingly retracted within its recess 50 due to the inherent resiliency of the bracket 44, and the base 45 of the bracket 44 rests substantially flush upon the inclined forward face 48 of the motor frame 20. The angle at which the face 48 is inclined is denoted as at A; and preferably, the angle A is a slight acute angle in the order of 1½ degrees. The bracket 44 has a degree of inherent resiliency, as previously noted, and tends to pivot about an axis. This pivot axis is substantially vertical when the tool is oriented in its usual operating position shown in FIGURE 1, and is substantially near the center line X–Y of the securing screw (or screws) 47. When the screw 56 is advanced into the housing, as shown in FIGURE 6b, the wedge 49 is accordingly advanced within its recess 50 so as to urge the bracket 44 away from the inclined face 48—against the inherent resiliency of the bracket 44—and about the pivot axis.

In such a manner, the bracket 44 is constrained, so that its legs 46 are brought closer together, with the degree of constraint being controlled by the pin 52 and slot 53. When the legs 46 of the bracket 44 are brought closer together, the axis of each axle 28 will shift accordingly so as to thereby aline each respective pulley 25 with respect to the belt 17. Since the upper and lower guiding pulleys 25 are conjointly mounted upon the first bracket 22, an adjustment in the alinement of the bottom pulley 25, shown in FIGURE 4, will be substantially imparted to the upper pulley as well, so that both pulleys 25 "track" the belt simultaneously.

The purpose of the resilient washer 60, see FIGURE 6b, is to take up the "slack" (along the respective axle 28 of the lower guiding pulley 25) between the headed screw 34 and the respective leg 46 of the bracket 44, whenever the bracket 44 is constrained so that its legs 46 are brought closer together. The head of the respective screw 34 thus forms an abutment means on the respective axle 28, while the resilient washer 60 provides a yieldable means to accommodate the slack as shown in FIGURE 6b, and preferably, to prevent a relative rotation between the axle and the bracket.

The forward angular deflection of the bracket base 45 about the screws 47 is denoted as at B in FIGURE 6b. Preferably, the angle B is a slight acute angle in the order of 2 degrees. FIGURES 6a and 6b represent the alternate extremes in the movement of the bracket 44 and correspond to a preferred range of 2 degrees forward, 1½ degrees back. Because of the dimensions and material of the bracket 44, and its associated structure, the forward angular deflection of 2 degrees of the bracket 44 corresponds approximately to 1½ degrees of forward movement of the axle 28. Thus, within the range of approximately 1½ degrees forward, 1½ degrees back, for a total preferred range of approximately 3 degrees, the tracking means of the present invention may be adjusted so as to aline the guiding pulley means with respect to the belt 17. This operating range represents only one preferred embodiment thereof, and is herein disclosed so that the utility and advantages of the improved structure may be more easily appreciated.

FIGURE 7 represents a modification of the present invention. In FIGURE 7, the wedge 49 and its associated adjusting screw 56 have been eliminated and replaced by a screw 61 carried by a boss 62 formed in the side wall 12 of the housing. The screw 61 has a conical tip 63 which wedges directly between the bracket base 45 and the inclined forward face 48. The operation of this modified form of the invention is substantially identical to that which has been described previously, and again, involves the use of the inherent resiliency of the bracket 44 and its cooperation with the inclined forward face 48 of the motor frame or equivalent portion of the housing.

Obviously, many modifications may be made without departing from the basic spirit of the present invention; and accordingly, within the scope of the appended claims, the invention may be practiced other than has been specifically described herein.

We claim:
1. In an abrading tool having a housing, an endless belt within the housing, power-operated means to drive the belt, and guiding pulley means for the belt; the improvement in belt tracking means, which comprises:
 (a) means including an inherently resilient bracket member for supporting the guiding pulley means within the belt;
 (b) said bracket member including a base which is disposed transversely of the belt and which is substantially parallel to the axis of sa'd guiding pulley means and spaced means supporting opposite sides of the guiding pulley means;
 (c) said base of said bracket member having an end portion rigidly fixed to the housing and further having a remaining portion cantilevered therefrom;
 (d) said inherently resilient bracket member being effective to urge the remaining portion of said base of said bracket member in a direction towards the housing and substantially about said secured end portion; and
 (e) adjustable means in opposition to said inherent resiliency for deflecting said base of said bracket member away from the housing and substantially about said secured end portion, thereby relatively moving said spaced supporting means and alining the axis of the guiding pulley means with respect to the belt.

2. The improvement of claim 1, which includes:
 (a) means providing a relief on the housing adjacent to the remaining portion of said base of said bracket member which extends from said secured end portion thereof;
 (b) said relief on the housing comprising an inclined face diverging in a direction away from said secured end portion of said base of said bracket member;

(c) whereby said bracket member, due to its degree of inherent resiliency, tends to spring back towards said inclined face on the housing.

3. The improvement of claim 1, wherein:
(a) said bracket member is bifurcated and said spaced means includes a pair of substantially-parallel legs formed integrally with said base; and wherein:
(b) the guiding pulley means includes an axle mounted between said legs of said bracket member.

4. The improvement of claim 3, wherein:
(a) said axle has at least one end portion extending beyond said respective leg of said bracket member;
(b) abutment means on said extending end portion; and
(c) yieldable means between said abutment means and said respective leg of said bracket member;
(d) whereby, whenever said base of said bracket member is deflected away from the housing by said adjustment means, said bracket member is constrained, thereby drawing said legs of said bracket member closer together; and
(e) whereby said yieldable means takes up the slack between said abutment means on said axle and said respective leg of said bracket member.

5. The improvement of claim 1, wherein said adjustable means comprises:
(a) a wedge carried by the housing for limited longitudinal sliding movement towards and away from said base portion of said bracket member;
(b) said wedge having a portion in engagement with said remaining portion of said base of said bracket member which extends from said secured end thereof;
(c) an externally-accessible screw carried by the housing transversely of said wedge for advance and retraction of said screw with respect to the housing; and
(d) said wedge having an inclined surface in engagement with said screw for urging said wedge towards said bracket member in response to the advance of said screw within said housing.

6. In an abrading tool having a housing, an endless belt within the housing, power-operated means to drive the belt, and guiding pulley means for the belt; the improvement in belt tracking means, which comprises:
(a) support means for the guiding pulley means; said support means including a member disposed transversely of the belt and substantially parallel to the axis of the guiding pulley means and spaced means supporting opposite sides of the guiding pulley means;
(b) said member having a degree of inherent resiliency;
(c) securing means rigidly fixing a portion of said member to the housing;
(d) means providing a relief on the housing adjacent to the remaining portion of said member, whereby the inherent resiliency of said member constantly urges said member in a direction towards the housing and substantially about said securing means as a deflection axis; and
(e) adjustable means in opposition to the inherent resiliency of said member for deflecting said member in the opposite direction substantially about the axis of said securing means, thereby relatively moving said spaced supporting means and alining the axis of the guiding pulley means with respect to the belt.

7. In a compact abrading tool having a housing, an endless belt within the housing, a motor means disposed within the belt, driving pulley means connected to the motor, and guiding pulley means for the belt; the improvement in the belt tracking means, which comprises:
(a) means including an inherently resilient bracket member for supporting the guiding pulley means within the belt;
(b) said bracket member including a base which is disposed transversely of the belt and which is substantially parallel to the axis of said guiding pulley means and spaced means supporting opposite sides of the guiding pulley means;
(c) means rigidly fixing one end of said base of said bracket member to said motor means and allowing deflection movement of the other end of said base about an axis which is substantially perpendicular to the axis of the guiding pulley means;
(d) means constantly urging said other end of said bracket member base about the deflection axis and in a direction towards the housing; and
(e) adjustable means in opposition to said last-named means for deflecting said other base end of said bracket member in the opposite direction about the deflection axis, thereby relatively moving said spaced supporting means and alining the axis of the guiding pulley means with respect to the belt;
(f) said adjustable means including a pair of cooperating elements carried by the housing and comprising:
(1) a first element mounted for longitudinal sliding movement in the housing and engaging said base of said bracket member; and
(2) a second element which is externally accessible; and
(g) at least one of said cooperating elements having an inclined surface in engagement with the other of said elements for urging said first element towards said base of said bracket member in response to movement of said second element inwardly of the housing.

8. A compact belt sander, comprising, in combination:
(a) a housing;
(b) an endless belt within said housing;
(c) a motor within a frame disposed along a generally longitudinal axis within said belt;
(d) driving pulley means within said belt at one end of said motor frame;
(e) means drivingly interconnecting said driving pulley means and said motor;
(f) guiding pulley means within said belt at the opposite end of the motor frame; and guiding pulley means having an axis which is transverse to the longitudinal axis of said motor;
(g) tracking means for pivotally adjusting said guiding pulley means about an axis which is perpendicular to the motor axis and to the axis of said guiding pulley means;
(h) said belt having a substantially horizontal lower run supported by a platen below said motor frame; and
(i) said tracking means including an inherently resilient bracket having a base disposed transversely of the belt and substantially parallel to the axis of the guiding pulley means, one portion of said base being rigidly fixed to said motor frame and another portion deflectable relative to said frame substantially about an axis perpendicular to the axis of the guiding pulley means;
(j) means for deflecting said other base portion;
(k) said bracket having spaced means supporting opposite sides of said guiding pulley means;
(l) whereby deflection of said other base portion relatively moves said spaced supporting means and aligns the axis of the guiding pulley means with respect to the belt.

9. In a tracking means for a belt sander having a housing, an endless belt and a motor, the improvement which comprises, in combination:
(a) an inherently resilient bifurcated supporting member having a base disposed transversely of said belt and a pair of legs with alined apertures formed therein, said base having a portion rigidly fixed to said housing and a portion deflectible relative thereto, said inherent resiliency of said supporting member being effective to urge said deflectible base portion toward said housing;

(b) an axle slidably mounted adjacent opposite ends within said apertures with a relatively close fit and having respective end portions, at least one of which extends beyond said member;

(c) a belt-guiding pulley carried by said axle and adapted to have said belt entrained thereover;

(d) means for deflecting said deflectible portion away from said housing thereby relatively moving said legs and adjusting the axis of said axle and said belt-guiding pulley carried thereon with respect to said belt;

(e) first and second abutment means on the ends of said axle, one of said abutment means resting against a respective leg of said member, and the other of said abutment means being spaced in relation to the other respective leg of said member when said member base is deflected so that said legs may be brought closer together; and (f) yieldable means disposed between said other abutment means and said respective leg of said member.

References Cited

UNITED STATES PATENTS

| | | | |
|---|---|---|---|
| 332,365 | 12/1885 | Stephens | 143—31 |
| 1,969,318 | 8/1934 | Myers | 51—170 |
| 2,178,865 | 11/1939 | Swan | 51—170 |
| 2,483,720 | 10/1949 | Asbury | 51—170 |
| 2,722,091 | 11/1955 | Dolan | 51—170 |
| 3,049,842 | 8/1962 | Murschel | 51—170 |
| 3,312,116 | 4/1967 | Blevins | 51—170 |

FOREIGN PATENTS

| | | |
|---|---|---|
| 576,146 | 5/1959 | Canada. |
| 509,554 | 1/1955 | Italy. |

HAROLD D. WHITEHEAD, *Primary Examiner.*

UNITED STATES PATENT OFFICE
CERTIFICATE OF CORRECTION

Patent No. 3,359,689                                          December 26, 1967

George W. McCarty et al.

It is hereby certified that error appears in the above numbered patent requiring correction and that the said Letters Patent should read as corrected below.

Column 1, after line 23, insert the following:

INTRODUCTION

The present invention relates to a belt sander or similar tool adapted for abrading, polishing, or burnishing operations and the like, and more particularly, to an improvement in the belt tracking means which facilitates a convenient, quick, and accurate alinement of the endless belt with respect to its guiding pulley means.

column 3, line 26, for "mtor" read -- motor --; line 30, for "to a" read -- to as a --; column 4, line 25, for "brackt" read -- bracket --; line 51, for "betwen" read -- between --.

Signed and sealed this 18th day of March 1969.

(SEAL)
Attest:

EDWARD M. FLETCHER, JR.                                  EDWARD J. BRENNER
Attesting Officer                                                          Commissioner of Patents